April 21, 1970      J. S. NELSON      3,507,112
CAST CHAINS WITH ELLIPTICAL LINKS
Filed July 24, 1967      2 Sheets-Sheet 1
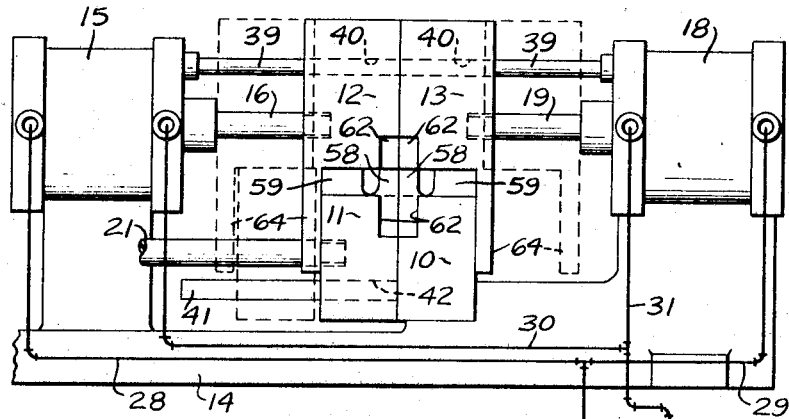
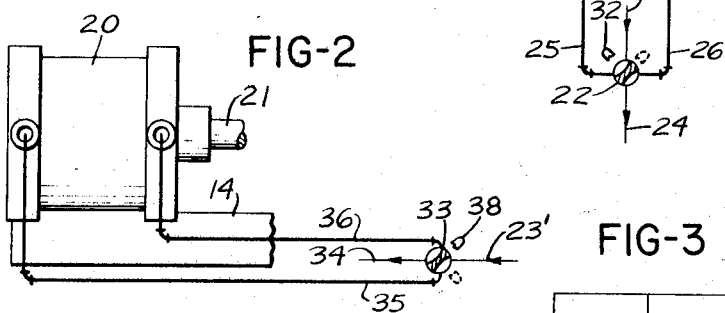
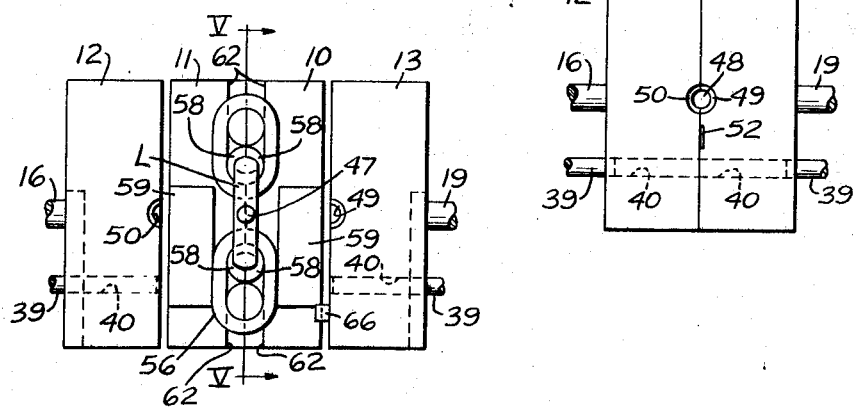
INVENTOR.
JOHN S. NELSON April 21, 1970　　　J. S. NELSON　　　3,507,112
CAST CHAINS WITH ELLIPTICAL LINKS
Filed July 24, 1967　　　　　　　　　　　2 Sheets-Sheet 2

INVENTOR.
JOHN S. NELSON
BY
Melvin A. Crosby

United States Patent Office 3,507,112
Patented Apr. 21, 1970

3,507,112
CAST CHAINS WITH ELLIPTICAL LINKS
John S. Nelson, 3793 W. River Parkway,
Grand Island, N.Y. 14072
Filed July 24, 1967, Ser. No. 655,402
Int. Cl. F16g 13/00; B22c 9/24, 9/30
U.S. Cl. 59—84           2 Claims

ABSTRACT OF THE DISCLOSURE

Chain with cast interengaging links in which the links in cross sectional shape are substantially elliptical.

---

This invention relates to cast chains as, for example, of aluminum or bronze.

Heretofore it has been customary to form the links for a chain from lengths of bar stock each of which is bent into a ring and then welding the opposing ends of the ring together. The use of such a method to form aluminum chain is not commercially feasible because of the difficulty and prohibitive cost of welding aluminum.

Aluminum or bronze chain is desirable for use where the conventional iron or steel chain rapidly corrodes and requires frequent maintenance. Further, because of its lighter weight, resistance to corrosion, and appearance, aluminum or bronze chain is more suited for ornamental purposes than the heavier iron chain. Also, by using the proper aluminum or bronze alloys, link chain having high strength properties can be produced.

In known cast chains, the links are round in cross section and thus engage one another with point contact. Such a small area of contact leads to rapid wear of the links and, where the chains are heavily loaded, can lead to deformation thereof at the points of interengagement of the links.

It is proposed by the present invention to shape the chain links so as to avoid the point contact referred to and to cause the links, instead to engage each other with not less than line contact and, preferably, over an appreciable area. Such interengagement of the chain links with each other will reduce wear and deformation thereof, and will permit more complete development of the strength of the chain.

The primary object of the present invention is thus to produce a cast chain having improved wear characteristics thereby enhancing the value of the chain for decorative purposes while also improving the strength characteristics of the chain thereby enhancing the value of the chain as a structural or working element, and to accomplish the foregoing in a simple manner.

Other advantages and objects will be apparent from the following description and accompanying drawings in which:

FIGURE 1 is an elevational view of one end of a permanent mold for casting chains, and shown as associated with apparatus partially illustrated, for operating the mold;

FIGURE 2 is a supplemental view showing additional apparatus, not illustrated in FIGURE 1, for operating the mold;

FIGURE 3 is a top plan view of the mold shown in FIGURE 1, with certain of the associated parts being illustrated fragmentarily;

FIGURE 4 is a top plan view similar to FIGURE 3, with the upper parts of the mold separated and showing the manner in which the central link cast in the mold is disposed with respect to adjacent chain links on either side;

Figure 5:
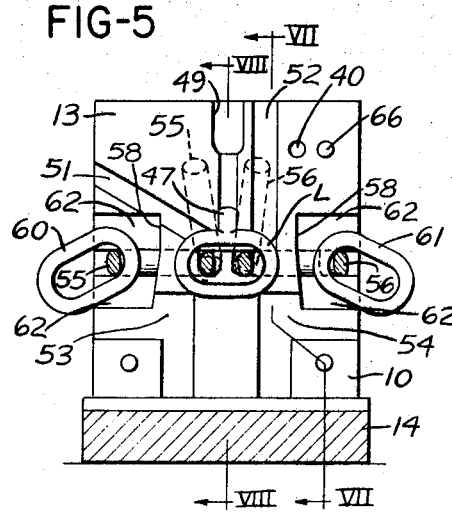
FIGURE 5 is a vertical central sectional view through the mold, this view taken on line V—V of FIGURE 4, and showing the disposition of the various links, additional links to those shown in FIGURE 4 being illustrated.

The permanent mold is shown as having four parts 10, 11, 12, and 13. Referring to FIGURE 1, the parts 10 and 11 are the lower right and left sections, respectively, and the parts 12 and 13 are the upper left and right sections respectively. The mold part 10 is shown as being mounted in a stationary position and for this purpose is suitably rigidly mounted on a base 14 which may be supported in any suitable manner. The other mold parts 11, 12, and 13 are shown as arranged for movement in a horizontal direction for the purpose of opening and closing the mold.

The means for moving the movable mold parts 11, 12 and 13 may be pneumatic piston and cylinder devices. In FIGURE 1, a cylinder 15 is shown as rigidly mounted on the base 14 and has its piston rod 16 connected to the upper left mold part 12; and a similar cylinder 18 is rigidly mounted on the base 14 to the right of the mold and has its piston rod 19 connected to the upper right mold part 13. Referring to FIGURE 2, which is an extension of the left end of the frame 14, there is shown a third cylinder 20 rigidly mounted thereon and having its piston rod 21 connected to the lower left mold part 11. The piston and cylinder devices are of the double acting type.

The pistons (not shown) slidably arranged in the various cylinders 15, 18 and 20 and connected to their respective piston rods 16, 19 and 21 are caused to reciprocate by fluid pressure supplied by a fluid main which will now be described. The numeral 22 represents a four-way valve connected on diametrically opposite sides to a source of fluid under pressure, such as a compressed air line 23 leading to any suitable source (not shown) of compressed air, and to an exhaust line 24 communicating with the atmosphere. Also connected to diametrically opposite sides of the valve 22 are lines 25 and 26. The line 25 has two branches 28 and 29, the branchline 28 leading to the end of the cylinder 15 remote from the mold and the branch line 29 leading to the end of the cylinder 18 remote from the mold. The line 26 also has two branches 30 and 31, the branch line 30 leading to that end of the cylinder 15 which is adjacent the mold, and the other branch line 31 leads to that end of the cylinder which is adjacent the mold. The valve 22 is operated by a control lever 32.

With control lever 32 in the full line position shown, compressed air is admitted from line 23, through the upper left passage of the valve into line 25, from whence the compressed air passes through branch lines 28 and 29 into their respective cylinders 15 and 18 at the ends thereof remote from the mold so as to urge the pistons toward each other and thereby bring the upper mold parts 12 and 13 together and so maintain them.

The opposite ends of these cylinders 15 and 18 are connected to the atmosphere through the branch lines 30 and 31, line 26, lower right passage of the valve 22 and exhaust line 24.

When the control lever 32 is swung to the right to the dotted line position, the valve 22 is rotated so as to establish communication between the lines 23 and 25 on the one hand, and the lines 24 and 26 on the other hand. This operates to reverse the pressures on the pistons in the various cylinders and cause the upper mold parts 12 and 13 to separate or open.

Turning now to the operation of the cylinder 20 which controls the movement of the lower left mold part 11, the numeral 33 represents a valve similar to the valve 22. Line 23' is the compressed air line and may be considered a branch of line 23. Line 34 is an exhaust line to the atmosphere and is diametrically opposite to line 23'. The other pair of lines connected to diametrically opposite sides of the valve 33 are the lines 35 and 36. The line 35 leads to that end of the cylinder 20 which is remote from the mold and the line 36 leads to the opposite end of this cylinder.

The valve 33 is shown as movable by a control lever 38. With lever 38 in the full line position shown, compressed air is admitted from line 23', through the lower right passage of the valve 33, thence through the line 35 to the remote end of the cylinder 20. This urges the piston and rod 21 to move to the right to close the lower left movable mold part 11 against the stationary mold part 10, and to maintain it so closed. When control lever 38 is swung downwardly to the lower position represented by the dotted lines, the valve 33 is rotated to establish communication between the compressed air line 23' and the line 36 on the one hand, and the exhaust line 34 and the line 35 on the other hand, and thereby reverse the pressures on the piston in the cylinder 20 so as to retract the piston rod 21 and separate the lower mold parts 11 and 10.

During opening and closing of the mold, the movable mold parts are guided so as to assure proper registry of the various parts when the mold is closed. To this end, each of the cylinders 15 and 18 carries a guide rod 39 which slides in a hole 40 provided in the upper mold parts 12 and 13. As shown, the corresponding guide rods 39 and holes 40 are in alignments with one another. Movement of the lower movable mold part 11 is guided on a rod 41 fixed to the stationary mold part 10 and projecting through a hole 42 in the movable mold part 11.

The mold parts 10, 11, 12 and 13 are shown as being in the form of metal blocks having their opposing vertical faces recessed to provide jointly a mold cavity for the link to be cast therein. Such a link is shown at L in FIGURES 4, 5, 7 and 8. All the mold parts meet along a common vertical plane represented by the line y—y in FIGURE 8, and along a common horizontal plane represented by the line x—x in FIGURE 8. It will be noted that the vertical parting line of the mold parts passes through the center of the link L, whereas the horizontal parting line of the mold parts is arranged above the midpoint of the spacing between the horizontal and parallel side stretches of the link L.

Figure 6:
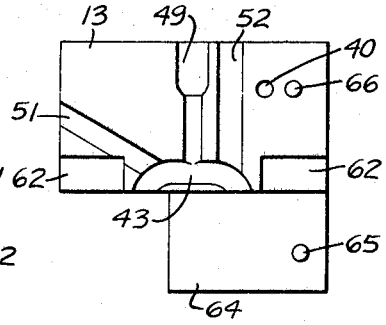
FIGURE 6 is a view similar to FIGURE 5, and showing only the inner face of one of the upper mold parts with the chain removed.

The inner vertical face of the upper mold part 13 is shown in FIGURE 6 in which the groove 43 has its ends turned downwardly to open to the lower face of the mold block. This groove 43 is substantially semi-ellipitcal in cross-section. A similar groove 44 is formed in the inner vertical face of the other upper mold part 12 (see FIGURE 8) and these two grooves 43 and 44 jointly form a channel substantially elliptical in cross section for the upper section of the link L.

Figures 7, 8:
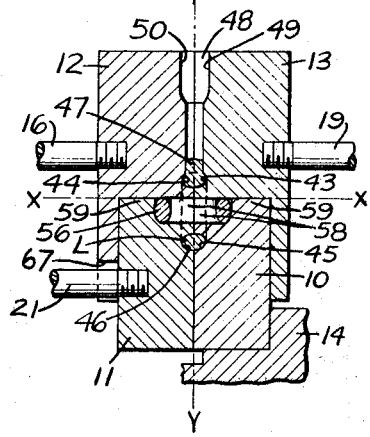
FIGURE 7 is a vertical cross sectional view of the mold in its fully closed position, and is indicated by line VII—VII on FIGURE 5.
FIGURE 8 is a similar cross sectional view taken on the line VIII—VIII of of FIGURE 5.

Referring to FIGURES 5, 6 and 7, the opposing vertical faces of the lower mold blocks 10 and 11 are formed respectively with grooves 45 and 46, substantially semi-elliptical in cross section, each turned up at its ends to form continuations of the grooves 43 and 44 respectively.

When the mold is closed, as shown in FIGURES 3 and 8, molten metal is poured into the mold cavity through a gate 48 formed by semi-circular grooves 49 and 50 provided respectively in the opposing vertical faces of the upper mold blocks 13 and 12. The grooves 49 and 50 forming the gate 48 lead to the mold cavity and, of course, will leave a sprue 47 on the link L which can be later removed as by grinding off the same.

Referring to FIGURE 5, two vents 51 and 52 are shown provided by grooves formed in the inner vertical face of the upper mold part 13, and also two similar grooves 53 and 54 in the inner vertical face of the lower mold part 10. The grooves 51, 52, 53 and 54 are only a few thousandths of an inch deep and it has been found that the molten metal will not flow into these grooves. These grooves are shown as provided only in the inner vertical faces of the mold parts 10 and 13, but it will be understood that they can be provided instead in the inner vertical faces of the other mold parts 11 and 12, or registered grooves can be provided in both faces as long as the thickness of the vent hole formed jointly by them is not more than a few thousandths of an inch. Also, the direction of the grooves and their number can be varied from that shown in the drawings as long as provision is made for a liberal venting of the mold cavity. With such a venting arrangement, I have found that good sound links can be cast with a very low percentage of rejects because of blowholes and the like.

Link L is cast so as to connect two links which have already been formed. This is illustrated in FIGURES 4 and 5 where the links 55 and 56 are to be connected by the link L. These links 55 and 56 have previously been formed singly as in a simple two part mold which forms no part of the present invention, and hence is not illustrated. Accommodation for the links 55 and 56 in a horizontal plane is provided by recessing the upper faces of the lower mold parts 10 and 11.

Referring to FIGURE 4, the upper surfaces of the mold parts 10 and 11 are recessed the thickness of the links 55 and 56 everywhere except for leaving a pair of raised tubular necks 58—58 which surround the curved portions of the link L at opposite ends thereof, and a pair of raised abutments 59—59 which engage the lower surfaces of the upper mold blocks 12 and 13, as shown in FIGURES 7 and 8.

Since additional links 60 and 61 may be connected to the links 55 and 56 respectively when the link L is cast, recesses 62 are provided at the adjacent corners of the various mold parts 10, 11, 12 and 13 to provide jointly recesses to accommodate the links 60 and 61 when the mold is fully closed.

To interconnect the mold parts 10, 11, 12 and 13 when the mold is fully closed, the upper mold parts 12 and 13 are shown as having depending skirt portions 63 and 64 respectively, which extend along and lie against the lateral outer faces of the lower mold blocks 11 and 10 respectively. The skirt portion 63 is cut out at 67 (FIGURE 6) to avoid interference with the piston rod 21. As shown in FIGURE 6, the skirt portion 64 for the upper mold port 13 has at least one dowel pin 65 which is received in a registered hole in the lower mold block 10. Although not shown, the skirt 63 for the other upper mold part 12 has a similar dowel pin and recess connection with the lower mold block 11. These dowel pins 65 prevent vertical separation of the mold blocks along the horizontal parting line.

The upper pair of mold blocks 12 and 13 are prevented from vertical displacement relative to each other along the vertical parting line by one or more dowel pins 66 on one of these blocks received in registered recesses in the other of these blocks. Similarly, the lower mold blocks 10 and 11 are prevented from displacement by dowel pins 68—68 on one of these blocks and received in registered recesses in the other of these blocks.

Assuming the apparatus to be in the condition shown in FIGURE 1 in which the mold is shown fully closed with no chain links arranged in any of its recesses, the control lever 32 for the valve 22 is turned to the dotted line position which will open the upper half of the mold by separating the upper mold blocks 12 and 13 to the position of these blocks shown in FIGURE 4. The already formed links 55 and 56 will then be placed flat or horizontally on the exposed upper surfaces of the lower mold parts 10 and 11 with the curved inner ends of these links embracing the upstanding necks 58—58. If additional links such as the links 60 and 61 shown in FIGURE 5 are on the links 55 and 56 respectively, the links 60 and 61 are set on end or vertically in the recesses 62 in the lower mold blocks 10 and 11.

The upper mold parts are then brought together again by returning the control lever 32 to its original full line position. This closes the mold fully and molten metal, such as aluminum or bronze, may thereupon be poured into the mold cavity through the gate 40 to form the link L with the sprue 47 thereon.

As previously explained, molten metal will not flow into the shallow broad vents. After the metal cools sufficiently, which is practically simultaneous with the pouring operations, the control lever 32 is again swung to the right to cause the upper mold parts to separate to the position shown in FIGURE 4. The links 55 and 56 are then turned upwardly about their inner ends to the dotted line position shown in FIGURE 5. This unlocks the split halves of the necks 58 which were projecting into the eyes or openings in the links 55 and 56 to permit the lower mold parts 10 and 11 to be separated which is thereupon accomplished by turning the control lever 38 for the valve 33 downwardly to its dotted line position. With the mold now fully open, the cast link L is free to be removed from the lower part of the mold cavity. The control lever 38 is then returned to its full line position which operates to close the lower mold parts 10 and 11 so that the mold again assumes the condition shown in FIGURE 4, preparatory to receiving additional preformed links corresponding to the links 55, 56, 60 and 61.

In the described manner, cast metal chain, such as aluminum or bronze chain can be produced in suitable quantity and with sufficient facility and rapidity to make the manufacture of such chain commercially practical. It will be understood that the sprues on the cast links L can be hammered off or ground off to improve the appearance of the chain.

Figure 9:
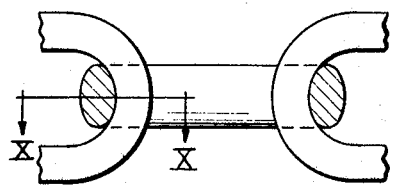
FIGURE 9 is a view showing a chain link in section.
Figure 10:
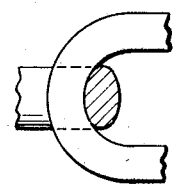
FIGURE 10 is a section on line X—X of FIGURE 9, showing how the chain links engage each other.

The forming of the links to the cross sectional configuration shown in FIGURES 9 and 10 provides for a good bearing of the links on each other. As will be seen in FIGURES 9 and 10, the links are substantially elliptical in cross sectional shape so that, instead of a point contact therebetween, at least a line contact is had. Preferably, the links engage each other over a substantial area and thus the wear and deformation of the links is reduced to a minimum.

It has been mentioned that the links are substantially elliptical in cross section, but it will be appreciated that the important advantages of the present invention are obtained by shaping the interengaging end portions of the links to complementary or substantially complementary shapes thereby to obtain the desired bearing conditions referred to. Thus, while a substantially elliptical cross section is referred to, and is of advantage because of ease of mold manufacture and appearance of the finished chain, the feature of the present invention pertaining to the manner in which the chain links interengage is obtained by the configuration of the insides of the link ends. It is a matter of convenience and appearance and of making the links uniformly strong that the links are made uniform in cross section throughout and symmetrical about two axes, as shown.

It will be understood that this invention is susceptible to modification in order to adapt it to different usages and conditions and, accordingly, it is desired to comprehend such modifications within this invention as may fall within the scope of the appended claims.

What is claimed is:

1. A cast chain having identical links individually cast in inter-linked relation to form a chain, each said link being longer in the direction of the length of the chain than in the direction transverse to the length of the chain and having substantially straight parallel sides in the direction of the length of the chain and curved ends joining the straight sides and interlinked with the curved ends of the adjacent links, each link being substantially elliptical in cross section in at least that portion of the curved ends thereof that engage the curved ends of adjacent links, the major diameter of the elliptical cross section of said links extending in a direction transverse to the plane of the respective link and being shorter than the distance between the inside surfaces of said straight sides of the link, the curvature of the inside surface of each end of each link as viewed from the side of the respective link having the same curvature as the major portion of the side of the end of the adjacent link which it engages whereby the chain is freely flexible in all directions while maintaining a large bearing area between adjacent links in all operative positions of the links.

2. A cast chain according to claim 1 in which each said link is substantially elliptical in cross section throughout the lengths thereof.

References Cited

UNITED STATES PATENTS 2,957,215  10/1960  Nelson _____ 249—57

FOREIGN PATENTS 532,001  10/1956  Canada.
750,115  1/1967  Canada.
688,540  2/1940  Germany.

RICHARD J. HERBST, Primary Examiner

G. P. CROSBY, Assistant Examiner

U.S. Cl. X.R.

249—57